United States Patent
Lutke et al.

(10) Patent No.: US 8,727,280 B1
(45) Date of Patent: May 20, 2014

(54) INFLATABLE AIRFOIL SYSTEM HAVING REDUCED RADAR AND INFRARED OBSERVABILITY

(75) Inventors: Kevin Reed Lutke, Huntington Beach, CA (US); Aaron Jonathan Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 897 days.

(21) Appl. No.: 12/633,272

(22) Filed: Dec. 8, 2009

(51) Int. Cl.
- *B64C 1/00* (2006.01)
- *B64C 3/00* (2006.01)
- *B64C 5/00* (2006.01)

(52) U.S. Cl.
USPC .................................................. 244/123.11

(58) Field of Classification Search
USPC ............... 244/217, 218, 219, 123.11, 123.12, 244/123.13, 123.14
See application file for complete search history.

(56) References Cited

U.S. PATENT DOCUMENTS

| | | | |
|---|---|---|---|
| 2,886,265 A | 5/1959 | Ritter et al. | |
| 2,979,287 A | 4/1961 | Ross | |
| 3,047,257 A | 7/1962 | Chester | |
| 3,184,187 A | 5/1965 | Isaac | |
| 3,473,761 A * | 10/1969 | Chutter | 244/119 |
| 3,711,039 A | 1/1973 | James | |
| 3,930,626 A | 1/1976 | Croswell, Jr. | |
| 3,957,232 A | 5/1976 | Sebrell | |
| 4,261,534 A | 4/1981 | Roselli | |
| 4,349,169 A | 9/1982 | McAnally | |
| 4,725,021 A * | 2/1988 | Priddy | 244/123.11 |
| 4,979,700 A | 12/1990 | Tiedeman et al. | |
| 5,005,783 A | 4/1991 | Taylor | |
| 5,181,678 A | 1/1993 | Widnall et al. | |
| 5,566,908 A | 10/1996 | Greenhalgh | |
| 5,697,579 A | 12/1997 | Hayashi | |
| 6,015,115 A | 1/2000 | Dorsett et al. | |
| 6,082,667 A | 7/2000 | Haggard | |
| 6,138,956 A | 10/2000 | Monner | |
| 6,199,796 B1 | 3/2001 | Reinhard et al. | |
| 6,260,797 B1 | 7/2001 | Palmer | |
| 6,347,769 B1 | 2/2002 | To et al. | |
| 6,419,189 B1 | 7/2002 | DiChiara, Jr. et al. | |

(Continued)

OTHER PUBLICATIONS

Cadogan et al., "Morphing Inflatable Wing Development for Compact Package Unmanned Aerial Vehicles", 45th AIAA/ASME/ASCE/AHS/ASC Structures, Structural Dynamics & Materials Conference, Apr. 2004, Palm Springs, CA, pp. 1-13.

(Continued)

*Primary Examiner* — Tien Dinh
*Assistant Examiner* — Michael A Fabula
(74) *Attorney, Agent, or Firm* — Yee & Associates, P.C.

(57) ABSTRACT

A method and apparatus for operating an airfoil system. A gas may be generated. The gas may be sent into an inflatable airfoil system comprising an inflatable air foil and a section. The inflatable airfoil may have an inner end and an outer end in which the inflatable airfoil may be comprised of a number of materials that substantially pass electromagnetic waves through the inflatable airfoil. The section may have a number of openings in which the inner end of the inflatable airfoil may be associated with the section. The section may be configured to be associated with a fuselage. The number of openings may be configured to provide communications with an interior of the inflatable airfoil. The section with the number of openings may be configured to reduce reflection of the electromagnetic waves encountering the section.

18 Claims, 9 Drawing Sheets

(56) References Cited

U.S. PATENT DOCUMENTS

| | | |
|---|---|---|
| 6,431,100 B2 | 8/2002 | Abshier |
| 6,536,712 B1 | 3/2003 | Barenett |
| 6,568,631 B1 | 5/2003 | Hillsdon |
| 6,568,640 B1 | 5/2003 | Barnett |
| 6,622,974 B1 * | 9/2003 | Dockter et al. ............... 244/219 |
| 6,648,272 B1 | 11/2003 | Kothmann |
| 6,786,456 B2 | 9/2004 | Veal et al. |
| 6,957,949 B2 * | 10/2005 | Hyde et al. .................. 416/97 R |
| 7,093,789 B2 | 8/2006 | Baroceloa et al. |
| 7,137,592 B2 | 11/2006 | Baroceloa et al. |
| 7,185,851 B2 | 3/2007 | Elam |
| 7,306,187 B2 | 12/2007 | Lavan |
| 7,424,988 B2 | 9/2008 | McDonnell |
| 7,770,962 B1 | 8/2010 | Maxwell |
| 7,777,165 B2 | 8/2010 | Sanderson et al. |
| 7,866,601 B2 | 1/2011 | Balaskovic |
| 7,963,485 B2 | 6/2011 | Koneczny |
| 8,042,772 B2 | 10/2011 | Lutke et al. |
| 8,104,713 B2 * | 1/2012 | Sanderson et al. ....... 244/123.11 |
| 8,342,451 B1 | 1/2013 | Lutke et al. |
| 8,393,576 B2 | 3/2013 | Lutke et al. |
| 2001/0018024 A1 * | 8/2001 | Hyde et al. .................. 416/96 R |
| 2001/0047745 A1 | 12/2001 | Abshier |
| 2002/0003189 A1 | 1/2002 | Kuenkler |
| 2003/0001044 A1 | 1/2003 | Munk |
| 2003/0192985 A1 | 10/2003 | Lipeles |
| 2004/0046085 A1 | 3/2004 | Veal et al. |
| 2004/0195431 A1 | 10/2004 | Yumlu et al. |
| 2005/0151007 A1 | 7/2005 | Cadogan et al. |
| 2005/0191930 A1 | 9/2005 | Foster et al. |
| 2005/0258305 A1 | 11/2005 | Piers et al. |
| 2005/0258306 A1 | 11/2005 | Barocela et al. |
| 2008/0083847 A1 * | 4/2008 | Mau ................................ 244/13 |
| 2008/0179454 A1 | 7/2008 | Balaskovic |
| 2009/0108135 A1 | 4/2009 | Shaw |
| 2009/0206192 A1 | 8/2009 | Sanderson et al. |
| 2009/0206196 A1 | 8/2009 | Parks et al. |
| 2009/0224108 A1 | 9/2009 | Lutke et al. |
| 2010/0001128 A1 | 1/2010 | Morehead et al. |
| 2010/0077693 A1 | 4/2010 | Cheynet de Beaupre |
| 2010/0096493 A1 | 4/2010 | Khakimov et al. |
| 2010/0237192 A1 * | 9/2010 | Sanderson et al. ....... 244/123.11 |
| 2011/0084174 A1 | 4/2011 | Hemmelgarn et al. |
| 2011/0163200 A1 | 7/2011 | Balaskovic |
| 2011/0168324 A1 | 7/2011 | Ender |
| 2012/0018571 A1 | 1/2012 | Goelet |
| 2012/0043416 A1 | 2/2012 | Morehead et al. |
| 2012/0048990 A1 | 3/2012 | Sommer |

OTHER PUBLICATIONS

Simpson et al., "Inflatable and Warpable Wings for Meso-scale UAVs", Infotech@Aeropspace, Sep. 2005, Arlington VA, 2005, pp. 1-13.

Cadogan et al., "Recent Development and Test of Inflatable Wings", 47th AIAA/ASME/ASCE/AHS/ASC Structures, Structural Dynamics & Materials Conference, May 2006, Newport RI, pp. 1-15.

Simpson et al., "Aeroelastic Deformation and Buckling of Inflatable Wings under Dynamic Loads", 48th AIAA/ASME/ASCE/AHS/ASC Structures, Structural Dynamics & Materials Conference, Honolulu, Hawaii, Apr. 2007, pp. 1-22.

Jacob et al., "Design of Hale Aircraft Using Inflatable Wings", 46th AIAA Aerospace Sciences Meeting and Exhibit, Jan. 2008, Reno Nevada, pp. 1-16.

Jacob et al., "Design Limitations of Deployable Wings for Small Low Altitude UAVs", 47th AIAA Aerospace Sciences Meeting Including teh New Horizons Forum and Aerospace Exposition, Jan. 2009, Orlando Florida, pp. 1-24.

Norris et al., "Historical Perspective on Inflatable Wing Structures", 50th AIAA/ASME/ASCE/AHS/ASC Structures, Structural Dynamics & Materials Conference, May 2009, Palm Springs, CA, pp. 1-10.

Haight et al., "Hybrid Inflatable/Rigidizable Wings for High Altitude Applications", 50th AIAA/ASME/ASCE/AHS/ASC Structures, Structural Dynamics & Materials Conference, May 2009, Palm Springs, CA, pp. 1-14.

Grant, "The Radar Game, Understanding Stealth and Aircraft Survivability", 1998, IRIS Independent Research, pp. 1-51.

U.S. Appl. No. 12/633,251, filed Dec. 8, 2009, Lutke et al.

U.S. Appl. No. 12/633,212, filed Dec. 8, 2009, Lutke et al.

USPTO Requirement for Restriction dated Mar. 2, 2012 for U.S. Appl. No. 12/633,251, 9 pages.

Amendment submitted with RCE dated Jun. 9, 2011 for U.S. Appl. No. 12/042,443, 16 pages.

USPTO Final Office Action dated Mar. 30, 2011 for U.S. Appl. No. 12/042,443, 8 pages.

USPTO Office Action dated Nov. 10, 2010 for U.S. Appl. No. 12/042,443, 13 pages.

USPTO Notice of Allowance dated Jul. 1, 2011 for U.S. Appl. No. 12/042,443, 7 pages.

Response to Final Office Action dated May 18, 2011 for U.S. Appl. No. 12/042,443, 16 pages.

Response to Office Action dated Feb. 8, 2011 for U.S. Appl. No. 12/042,443, 13 pages.

USPTO Office Action dated Dec. 30, 2011 for U.S. Appl. No. 13/267,614, 10 pages.

USPTO Office Action dated Jun. 15, 2012 for U.S. Appl. No. 13/267,614, 9 pages.

Response to Office Action dated Feb. 8, 2012 for U.S. Appl. No. 13/267,614, 6 pages.

Cadogan et al., "Inflatable Composite Habitat Structures for Lunar and Mars Exploration", ILC Dover, Inc, IAA-98-IAA.13.2.04 49th International Astronautical Congress, Sep.-Oct. 1998, 9 pages.

Cadogan et al., "Inflatable and Rigidizable Wings for Unmanned Aerial Vehicles", ILC Dover, Inc., 2nd AIAA "Unmanned Unlimited" Systems, Sep. 2003, 9 pages.

"UAV Wings", Inflatable wings, ILC Dover, Inc., accessed Jul. 10, 2012, 2 pages. http://www.ilcdover.com/UAV-Wings/.

Jones et al., "A High-Altitude Test of Inflatable Wings for Low-Density Flight Applications", ILC Dover, Inc., AIAA 2006-1696, Gossamer Spacecraft Forum, May 2006, 13 pages.

Scarborough et al., "Development of a Finite Element Model of Warping Inflatable Wings", ILC Dover, Inc., AIAA 2006-1697, AIAA Structures, Structural Dynamics and Materials Conference, May 2006, 19 pages.

Lutke et al., "Variable Pitch Airfoils", filed Dec. 8, 2009, U.S. Appl. No. 12/633,251, 45 pages.

Lutke et al., "Inflatable Fuselage", filed Dec. 8, 2009, U.S. Appl. No. 12/633,212, 45 pages.

"Inflatable Wings," Vertigo Inc., dated on or before Mar. 5, 2008, 3 pages, accessed Oct. 19, 2009 http://www.vertigo-inc.com/inflatable_wings/.

Notice of Allowance dated Jul. 9, 2012 regarding U.S. Appl. No. 13/445,708, 10 pages.

Notice of Allowance dated Aug. 27, 2012 regarding U.S. Appl. No. 12/633,251, 17 pages.

Final office action dated Jan. 18, 2013 regarding U.S. Appl. No, 13/267,614, 27 pages.

Final Office Action, dated May 21, 2013, regarding USPTO U.S. Appl. No. 12/633,212, 23 pages.

Office Action, dated Apr. 30, 2013, regarding USPTO U.S. Appl. No. 13/267,614, 11 pages.

* cited by examiner

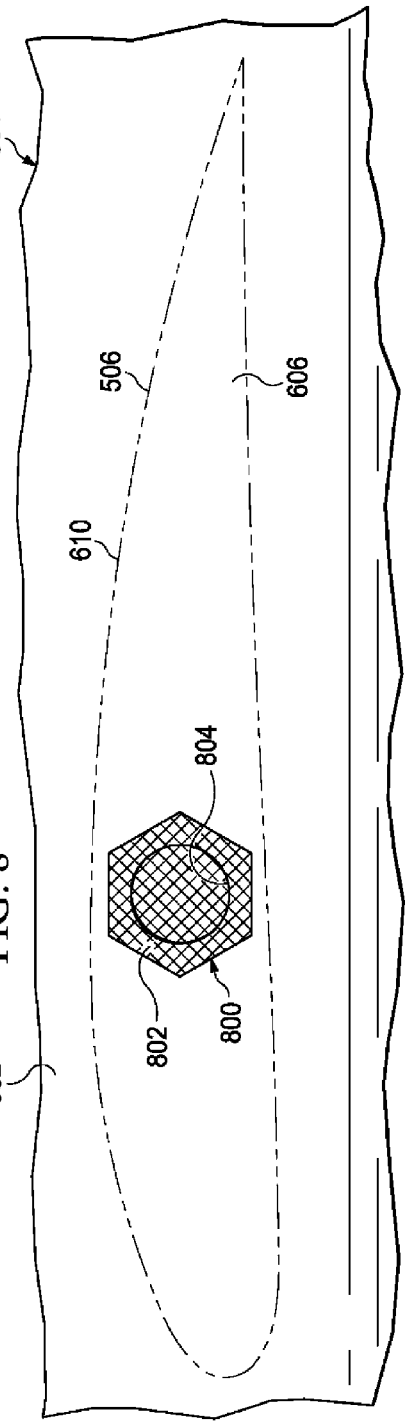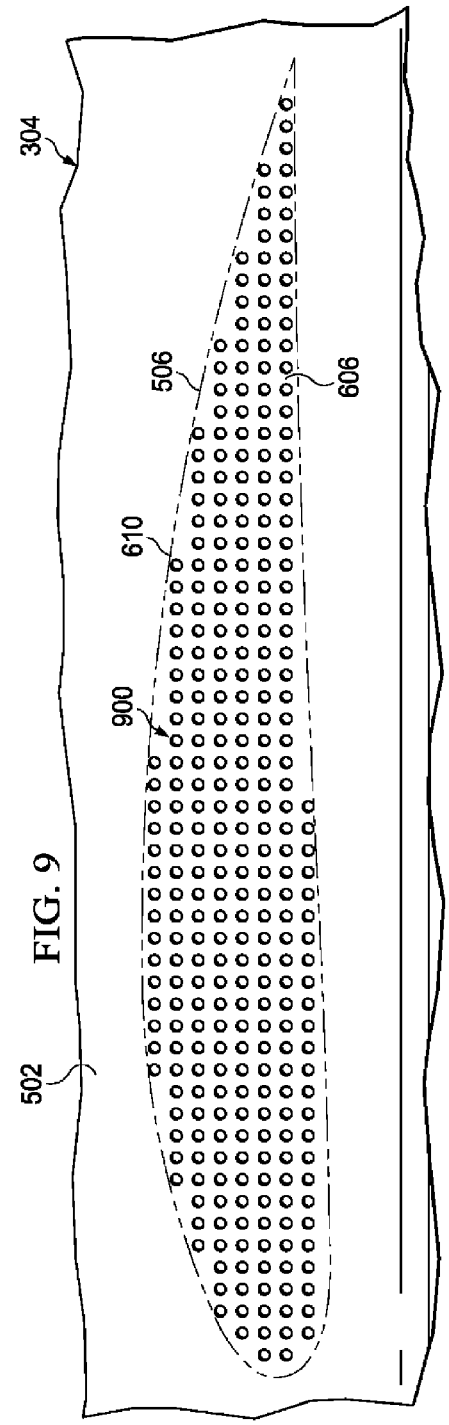

INFLATABLE AIRFOIL SYSTEM HAVING REDUCED RADAR AND INFRARED OBSERVABILITY

BACKGROUND INFORMATION

1. Field

The present disclosure relates generally to aircraft and, in particular, to aircraft structures. Still more particularly, the present disclosure relates to a method and apparatus for a wing for an aircraft.

2. Background

An unmanned aerial vehicle (UAV) may be an aircraft that may fly without human operators being present in the aircraft. Unmanned aerial vehicles may come in a number of different shapes, sizes, configurations, and/or characteristics. Unmanned aerial vehicles may, for example, without limitation, take the form of fixed wing aircraft and/or helicopters.

Unmanned aerial vehicles may be controlled from a remote location. At this remote location, a human operator or a program executed by a computer may generate commands for the unmanned aerial vehicle. Unmanned aerial vehicles also may be controlled using a program running on a computer or other controller on the unmanned aerial vehicle.

Unmanned aerial vehicles may be used for a number of different purposes. Currently, the largest use may be for military applications. Unmanned aerial vehicles may be used to perform missions that may include, for example, without limitation, reconnaissance missions, attack missions, and/or other suitable types of missions.

Unmanned aerial vehicles also may be used in a number of civilian applications. For example, without limitation, unmanned aerial vehicles may be used to perform surveying, firefighting, and other suitable types of missions.

In some cases, it may be desirable to reduce the footprint or size of an unmanned aerial vehicle prior to its use. For example, without limitation, it may be desirable to pack or stow an unmanned aerial vehicle for launching. The launching of the unmanned aerial vehicle may be by hand, air drop, missile, gun, or other suitable types of delivery system.

In meeting these types of goals for launching and/or transporting unmanned aerial vehicles, inflatable components have been developed. These inflatable components may provide for more compact packaging for stowing, transportation, and/or launching of the unmanned aerial vehicles. Additionally, these inflatable components also may be designed to provide for a desired speed of deployment, while reducing the mass and complexity of the components.

For example, without limitation, wings have been designed using inflatable structures. With inflatable wings, a non-mechanical mechanism for stowing and deploying these types of structures may be present. Further, with inflatable wings, controlled deformations of the wings may be performed using actuation systems that may be located on or within the inflatable wings. These systems may deform and/or otherwise bend the wings to provide the desired amount of lift and/or control of the movement of the unmanned aerial vehicle.

With inflatable wings, durability may be a concern. The durability may involve the ability of inflatable wings to survive when launched by a delivery system, such as a gun or missile. Additionally, the durability of these components also may involve the ability of the components to be reusable over a number deflations and inflations of these components. The durability of these components also may involve the storage of the components in either a packed or inflated state for extended periods of time in extreme and/or unfavorable conditions.

Also, when an unmanned aerial vehicle lands or impacts an object, the survivability of the inflatable components may be desirable. Other durability goals may include, for example, without limitation, the ability of inflatable wings to function as desired with different levels of wind gusts and/or currents.

Accordingly, it would be advantageous to have a method and apparatus which takes into account one or more of the issues discussed above, as well as possibly other issues.

SUMMARY

In one advantageous embodiment, an apparatus may comprise an inflatable airfoil and a section. The inflatable airfoil may have an inner end and an outer end in which the inflatable airfoil may be comprised of a number of materials that substantially pass electromagnetic waves through the inflatable airfoil. The section may have a number of openings in which the inner end of the inflatable airfoil may be associated with the section. The section may be configured to be associated with a fuselage. The number of openings may be configured to provide communications with an interior of the inflatable airfoil. The section with the number of openings may be configured to reduce reflection of the electromagnetic waves encountering the section.

In another advantageous embodiment, an airfoil system for an unmanned aerial vehicle may comprise an inflatable airfoil, a section, an interface, an airfoil skin, a heat exchanging system, and an inflation system. The inflatable airfoil may have an inner end and an outer end in which the inflatable airfoil may be comprised of a number of materials that substantially pass electromagnetic waves through the inflatable airfoil. The section may have a number of openings in which the inner end of the inflatable airfoil may be associated with the section. The section may be configured to be associated with a fuselage. The number of openings may be in communications with an interior of the inflatable airfoil. The section with the number of openings may be configured to reduce reflection of the electromagnetic waves encountering the section. The section with the number of openings may be configured to form an electrically continuous surface with the fuselage. The section with the number of openings may be configured to allow an electrical current to flow between the section and the fuselage. The section with the number of openings may be configured to reduce an entry of the electromagnetic waves into an interior of the fuselage. The interface may be located between the fuselage and the section in which the interface may be configured to be electrically continuous with the fuselage and the section. The inner end of the inflatable airfoil may be associated with the interface. The airfoil skin may form a surface of the inflatable airfoil in which a portion of the airfoil skin at the inner end of the inflatable airfoil associated with the interface by a serpentine seal may have a conductive material. The heat exchange system may comprise a plurality of channels within the inflatable airfoil and a first number of openings and second number of openings in the number of openings in the section in communication with the plurality of channels. The first number of openings may be configured to send a heated gas from a heat source into the plurality of channels, and the second number of openings may be configured to send a cooled gas out of the plurality of channels. The second number of openings may be in a location selected from at least one of the inner end of the inflatable airfoil, the surface of the inflatable airfoil, the outer end of the inflatable airfoil, a leading edge of the inflatable airfoil, and a trailing edge of the inflatable airfoil. The inflation system may be connected to the inflatable airfoil by at least a portion of the number of openings in the section.

The electromagnetic waves may have a frequency from about 30 MHz to about 300 GHz. The inflatable airfoil may be selected from one of a wing, a canard, a stabilizer, a horizontal stabilizer, a vertical stabilizer, and a V-shaped stabilizer.

In still another advantageous embodiment, an apparatus comprises an airfoil that may have an inner end and an outer end in a plurality of channels within the airfoil. The apparatus may have a first number of openings in communication with the plurality of channels and may have a second number of openings in communication with the plurality of channels. The first number of openings may be configured to send a heated gas from a heat source into the plurality of channels, and the second number of openings may be configured to send a cooled gas out of the plurality of channels.

In yet another advantageous embodiment, a method may be present for operating an airfoil system. A gas may be generated. The gas may be sent into an inflatable airfoil system comprising an inflatable air foil and a section. The inflatable airfoil may have an inner end and an outer end in which the inflatable airfoil may be comprised of a number of materials that substantially pass electromagnetic waves through the inflatable airfoil. The section may have a number of openings in which the inner end of the inflatable airfoil may be associated with the section. The section may be configured to be associated with a fuselage. The number of openings may be configured to provide communications with an interior of the inflatable airfoil. The section with the number of openings may be configured to reduce reflection of the electromagnetic waves encountering the section.

In another advantageous embodiment, a method for operating an airfoil system may be present. A heated gas may be sent from a heat source through a first number of openings into a plurality of channels within an inflatable airfoil. A cooled gas may be received from the plurality of channels through the second number of openings.

In still yet another advantageous embodiment, a method may be present for operating an inflatable airfoil system for an unmanned aerial vehicle. A gas may be generated. The gas may be sent into the inflatable airfoil system comprising an inflatable air foil, a section, and an interface. The inflatable airfoil may have an inner end, an outer end, a plurality of channels within the inflatable airfoil, a first number of openings in a number of openings in the section in communication with the plurality of channels, and a second number of openings in communication with the plurality of channels. The first number of openings may be configured to send a heated gas from a heat source into the plurality of channels, and the second number of openings may be configured to send a cooled gas out of the plurality of channels. The inflatable airfoil may be comprised of a number of materials that substantially pass electromagnetic waves through the inflatable airfoil. The section may have the number of openings in which the inner end of the inflatable airfoil may be associated with the section. The section may be configured to be associated with a fuselage. The number of openings may be configured to provide communications with an interior of the inflatable airfoil. The section with the number of openings may be configured to reduce reflection of the electromagnetic waves encountering the section. The section with the number of openings may be configured to form an electrically continuous surface with the fuselage. The section with the number of openings may be configured to allow an electrical current to flow between the section and the fuselage. The section with the number of openings may be configured to reduce the electromagnetic waves entering an interior of the fuselage. The interface may be located between the fuselage and the section and configured to be electrically continuous with the fuselage and the section. The inner end of the inflatable airfoil may be associated with the interface. A portion of an airfoil skin at the inner end of the inflatable airfoil associated with the interface by a serpentine seal may have a conductive material. The heated gas may be sent through the first number of openings into the plurality of channels within the inflatable airfoil. The cooled gas may be received from the plurality of channels through the second number of openings.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 8 is an illustration of a portion of an airfoil system in accordance with an advantageous embodiment;

FIG. 9 is an illustration of a portion of an airfoil system in accordance with an advantageous embodiment;

DETAILED DESCRIPTION

Figure 1:
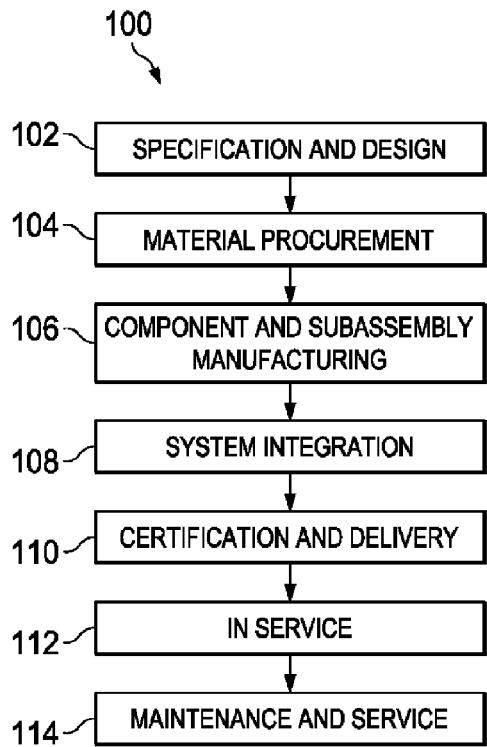
FIG. 1 is an illustration of an aircraft manufacturing and service method in accordance with an advantageous embodiment.
Figure 2:
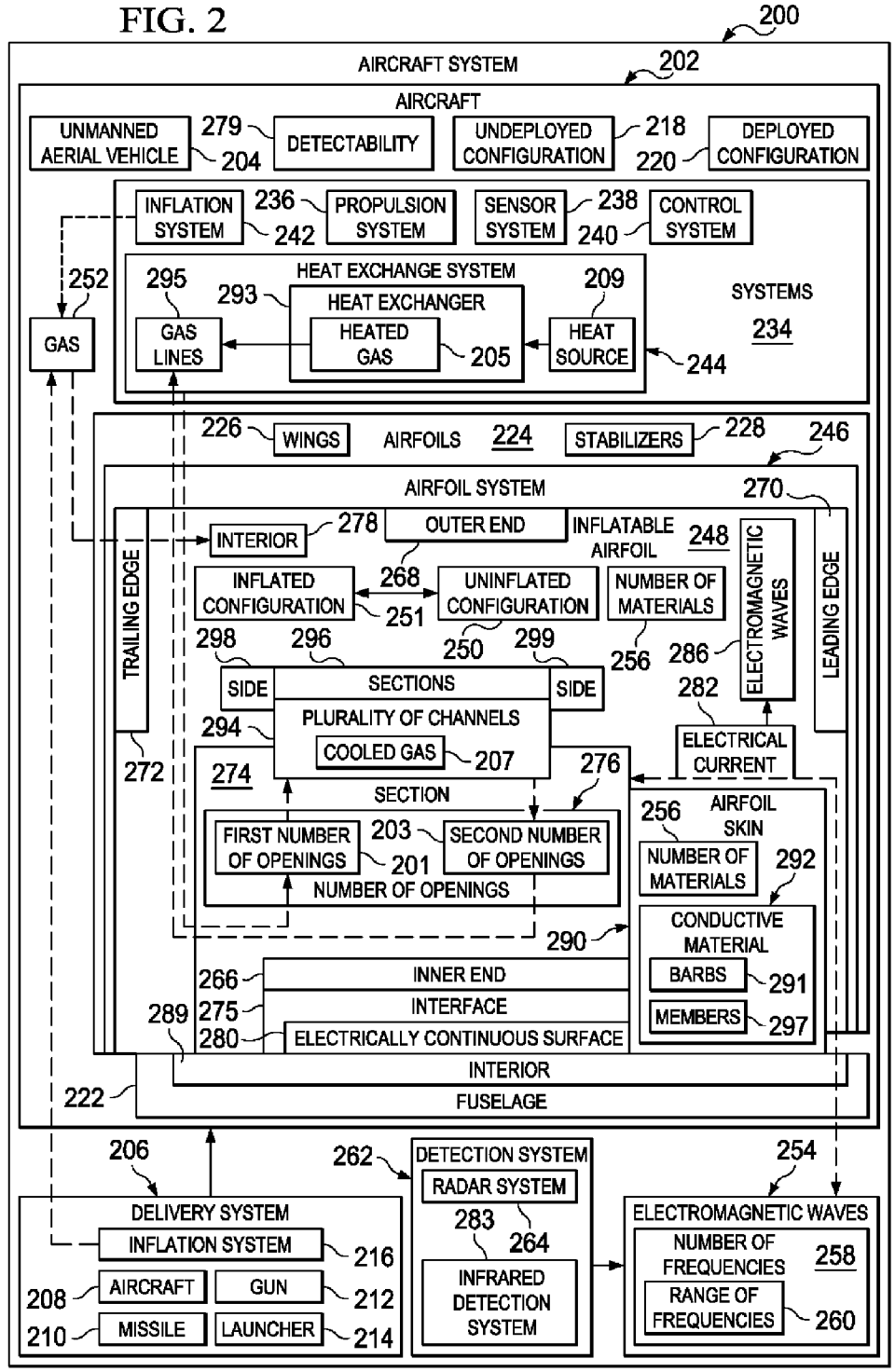
FIG. 2 is an illustration of an aircraft system in accordance with an advantageous embodiment.

Referring more particularly to the drawings, embodiments of the disclosure may be described in the context of aircraft manufacturing and service method 100 as shown in FIG. 1 and aircraft 202 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 202 in FIG. 2 and material procurement 104.

During production, component and subassembly manufacturing 106 and system integration 108 of aircraft 202 in FIG.

2 takes place. Thereafter, aircraft 202 in FIG. 2 may go through certification and delivery 110 in order to be placed in service 112. While in service by a customer, aircraft 202 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, government agency, service organization, and so on.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 202 in FIG. 2 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items means, one or more items. For example, without limitation, a number of apparatus embodiments may be one or more apparatus embodiments. A number of apparatus embodiments, method embodiments, or a combination thereof may be utilized while aircraft 202 in FIG. 2 is in service 112 and/or during maintenance and service 114 in FIG. 1. The use of a number of the different advantageous embodiments may substantially expedite the assembly of and/or reduce the cost of aircraft 202 in FIG. 2.

The different advantageous embodiments recognize and take into account a number of different considerations. For example, without limitation, the different embodiments recognize and take into account that unmanned aerial vehicles may be required to fly at high altitudes for long periods of time. With these types of requirements, it often may be desirable for the unmanned aerial vehicle to provide lift in the wings needed to fly at these altitudes for the desired periods of time. As the wings are designed to have increased lift, the detectability of the unmanned aerial vehicle increases. For example, without limitation, unswept wings may provide more efficient lift for an unmanned aerial vehicle. This configuration of wings, however, may increase the detectability of the aircraft with respect to various detection systems and directions. With an unswept wing configuration, the wings may reflect more electromagnetic waves, such as those from a radar system, as compared to using a swept wing configuration. A swept wing configuration may provide lower detectability in certain directions. This type of configuration, however, may not provide as efficient lift as compared to an unswept wing.

Therefore, the different advantageous embodiments recognize and take into account that one solution may be to employ wings or other airfoils that are not detectable by sensor systems, such as radar, using electromagnetic waves. The different advantageous embodiments recognize and take into account that it may be advantageous to have an airfoil, such as a wing, that is non-reflective to electromagnetic waves. For example, without limitation, the airfoil may be transparent such that electromagnetic waves substantially pass through the wing. The wing may be transparent if the electromagnetic waves pass through the wing.

Thus, the different advantageous embodiments may provide a method and apparatus for an airfoil system for an aircraft. In one advantageous embodiment, an apparatus may comprise an inflatable airfoil having an inner end and an outer end. The inflatable airfoil may be comprised of a number of materials that may substantially pass electromagnetic waves through the inflatable airfoil. The apparatus also may comprise a section having a number of openings in which the inner end of the inflatable airfoil may be associated with the section and in which the number of openings may be configured to provide access to the interior of the inflatable airfoil. The section with the number of openings also may be configured to reduce reflection of the electromagnetic waves encountering the section. Further, the section with the number of openings may reduce the entry of electromagnetic waves into the interior of the fuselage.

With reference now to FIG. 2, an illustration of an aircraft system is depicted in accordance with an advantageous embodiment. Aircraft system 200 may include aircraft 202. Aircraft 202 may be, for example, without limitation, unmanned aerial vehicle 204. Unmanned aerial vehicle 204 may be produced by aircraft manufacturing and service method 100 in FIG. 1.

Unmanned aerial vehicle 204 may be transported and/or launched using delivery system 206. Delivery system 206 also may be manufactured as part of aircraft system 200 for unmanned aerial vehicle 204 using aircraft manufacturing and service method 100 in FIG. 1. In these illustrative examples, delivery system 206 may include at least one of aircraft 208, missile 210, gun 212, launcher 214, and/or other suitable delivery systems. Further, delivery system 206 also may include inflation system 216. Alternately, aircraft 202 may be launched under its own power.

Aircraft 202 may be in undeployed configuration 218 for storage and/or delivery by delivery system 206. When deployed or launched by delivery system 206, aircraft 202 may change into deployed configuration 220. Changing aircraft 202 from undeployed configuration 218 to deployed configuration 220 may be performed using inflation system 216.

As illustrated, aircraft 208 may have fuselage 222 and airfoils 224. In these illustrative examples, an airfoil is a device or structure configured to provide at least one of lift for an aircraft and control an aircraft during flight. For example, without limitation, an airfoil may be a wing for an aircraft, a control surface, an aerodynamic surface, or some other suitable type of structure. A control surface may be, for example, without limitation, a flap, an aileron, a spoiler, an elevator, a rudder, and/or some other suitable structure. An aerodynamic surface may be, for example, a horizontal stabilizer, a vertical stabilizer, a canard, or some other suitable structure.

For example, without limitation, airfoils 224 may take the form of wings 226, stabilizers 228, and/or other types of airfoils. Stabilizers 228 may include, for example, without limitation, vertical stabilizers, horizontal stabilizers, canards, V-shaped stabilizers, and other suitable types of stabilizers. In these illustrative examples, fuselage 222 may be a structure for which airfoils 224 are fixed or moveably attached. In these illustrative examples, aircraft 202 may include systems 234. Systems 234 may comprise, for example, without limitation, propulsion system 236, sensor system 238, control system 240, inflation system 242, heat exchange system 244, payload, and/or other suitable types of systems.

In these illustrative examples, airfoil system 246 may be an example of an airfoil system within airfoils 224. Airfoil system 246 may include inflatable airfoil 248.

Inflatable airfoil 248 may be changed between uninflated configuration 250 and inflated configuration 251 using at least one of inflation system 216 within delivery system 206 and/or inflation system 242 within aircraft 202. Inflation system 216 and/or inflation system 242 may send gas 252 into inflatable airfoil 248. Gas 252 may change inflatable airfoil 248 from uninflated configuration 250 to inflated configuration 252. In these illustrative examples, gas 252 may take various forms. For example, without limitation, gas 252 may be at least one of air, helium, nitrogen, and/or some other suitable gas. Additionally, gas 252 may be a mixture of different types of gases. Also, gas 252 may be selected as a gas that has electromagnetic properties similar to air for a reduction in radar signature. Gas 252 also may be selected as a gas with a thermal conductivity that increases the efficiency of heat exchanger 293.

In these illustrative examples, inflatable airfoil 248 may be non-reflective with respect to electromagnetic waves 254. For example, without limitation, inflatable airfoil 248 may be transparent with respect to electromagnetic waves 254. In other words, electromagnetic waves 254 may substantially pass through inflatable airfoil 248.

Inflatable airfoil 248 may be comprised of number of materials 256. Number of materials 256 may be selected such that electromagnetic waves 254 substantially pass through inflatable airfoil 248. Number of materials 256 may comprise at least one of polyurethane, a bi-directional polyester film, plastic, a para-aramid synthetic fiber with an airtight liner, nylon with an airtight liner, a fiber comprised of an aromatic polyester, and/or other suitable materials.

In the illustrative examples, number of materials 256 may be selected to pass number of frequencies 258 for electromagnetic waves 254 through inflatable airfoil 248. Number of frequencies 258 may be a single frequency or may be range of frequencies 260. In these illustrative examples, number of frequencies 258 may be, for example, without limitation, from about 30 megahertz to about 300 gigahertz. Of course, number of frequencies 258 may be any range or number of frequencies.

Of course, any frequency used by detection system 262 employing electromagnetic waves 254 may be used. In these examples, detection system 262 may be, for example, without limitation, radar system 264. In these illustrative examples, inflatable airfoil 248 may have inner end 266, outer end 268, leading edge 270, and trailing edge 272. Inner end 266 may be associated with fuselage 222.

Airfoil system 246 may also include section 274. Section 274 may be associated with fuselage 222. In these illustrative examples, inner end 266 also may be associated with section 274. Interface 275 may occur where section 274 meets fuselage 222. Interface 275 also may be a location where inner end 266 meets section 274 and/or fuselage 222. Further, the association of inner end 266 of inflatable airfoil 248 with at least one of fuselage 222 and section 274 may be at interface 275. Section 274 may have number of openings 276. Number of openings 276 may be configured to provide access to interior 278 of inflatable airfoil 248. Section 274 with number of openings 276 may be configured to reduce reflection of electromagnetic waves 254 encountering section 274. In some illustrative examples, number of openings 276 may be formed using, for example, without limitation, a screen, a conductive mesh, and/or some other suitable component associated with fuselage 222. In yet other advantageous embodiments, section 274 may be a part of fuselage 222.

In these illustrative examples, section 274 with number of openings 276 may be configured to form electrically continuous surface 280 with fuselage 222. If electromagnetic waves 254 encounter section 274, electrical current 282 may be generated. Electrical current 282 may travel between section 274 and fuselage 222 without causing any substantial emission of electromagnetic waves 286.

The emission of electromagnetic waves 286 may be reduced and/or eliminated when electrical current 282 travels between section 274 and fuselage 222. In other words, interface 275 between fuselage 222 and section 274 may be configured to be electrically continuous. Section 274 with number of openings 276 may be configured to reduce the passing of electromagnetic waves 254 through section 274 into interior 289 of fuselage 222. For example, without limitation, airfoil skin 290 may be comprised of number of materials 256 and may be attached to section 274 and fuselage 222 at interface 275. Conductive material 292 may be associated with airfoil skin 290 at interface 275. For example, without limitation, conductive material 292 may be integrated into airfoil skin 290 at interface 275 or around interface 275 such that electrical current 282 generated in section 274 may be capable of travelling to fuselage 222 without substantially emitting electromagnetic waves 286.

Conductive material 292 also may be associated with airfoil skin 290 by being coated on airfoil skin 290. In other advantageous embodiments, conductive material 292 may take the form of barbs 291 or members 297 that penetrate airfoil skin 290 at or around interface 275 to associate conductive material 292 with airfoil skin 290.

In these illustrative examples, heat exchange system 244 may include inflatable airfoil 248 and heat exchanger 293. Inflatable airfoil 248 may be connected to heat exchanger 293 by gas lines 295.

In some advantageous embodiments, plurality of channels 294 may be present within inflatable airfoil 248. Plurality of channels 294 may be formed by sections 296. In some advantageous embodiments, sections 296 may form plurality of channels 294 by extending between side 298 and side 299 of inflatable airfoil 248. In these examples, first number of openings 201 in number of openings 276 in section 274 may be in communication with plurality of channels 294. Second number of openings 203 in number of openings 276 in section 274 also may be in communication with plurality of channels 294. Second number of openings 203 may be in a number of different locations. Second number of openings 203 may be a portion of number of openings 276 in section 274.

In other advantageous embodiments, second number of openings 203 may be located in airfoil skin 290. For example, without limitation, second number of openings 203 may be located at or around outer end 268, leading edge 270, trailing edge 272, or some other suitable location on inflatable airfoil 248.

During operation of heat exchange system 244, heat exchanger 293 may circulate heated gas 205 through plurality of channels 294. This circulation of heated gas 205 through plurality of channels 294 may cool heated gas 205 to form cooled gas 207. In these illustrative examples, heated gas 203 may be a heated form of gas 252. In these illustrative examples, first number of openings 201 may be configured to receive heated gas 205 from heat exchanger 293 through gas lines 295 into plurality of channels 294. Second number of openings 203 may be configured to send cooled gas 207 out of plurality of channels 294.

Cooled gas 207 may return to heat exchanger 293 through gas lines 295. Heated air 205 may be generated by heat exchanger 293 obtaining heat from heat source 209. Heat source 209 may be, for example, without limitation, a propulsion unit, a sensor system, a control system, or some other suitable source of heat.

Heated gas 205 may have a temperature higher than cooled gas 207. In these illustrative examples, plurality of channels 294 may be separated from each other or in communication with each other, depending on the particular implementation.

By distributing heated gas 205 through plurality of channels 294 in inflatable airfoil 248, detectability 279 of aircraft 202 may be reduced with respect to detection system 262 in the form of infrared detection system 283 in addition to radar system 264. Further, in these advantageous embodiments, the distribution of heated gas 205 and cooled gas 207 through plurality of channels 294 may reduce detectability 279 of aircraft 202 when detection system 262 is configured to detect heat. This system of gas distribution may provide a lower detectability as compared to currently used systems that emit exhaust gases. In other words, this system of gas distribution may allow exhaust gases generated by heat source 209 to be hidden from detection system 262. In this manner, detectability 279 of aircraft 202 with respect to heat from exhaust gases may be reduced.

Still further, in these illustrative examples, the distribution of heated gas 205 and cooled gas 207 through plurality of channels 294 may allow inflatable airfoil 248 to maintain inflatable configuration 251. In this manner, the configuration and/or design of airfoils 224 may not be constrained to currently used shapes for reducing detectability 279 to electromagnetic waves 254. Through the use of airfoil system 246, airfoils, such as inflatable airfoil 248, may be substantially non-reflective with respect to electromagnetic waves 254 directed at aircraft 202. The illustration of aircraft system 200 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, other airfoils within airfoils 224 also may be implemented using airfoil system 246. For example, airfoil system 246 may be used to implement at least one of wings 226, stabilizers 228, and/or other suitable types of airfoils within airfoils 224. In addition, in some advantageous embodiments, heat exchange system 244 may not be present in aircraft 202. In yet other advantageous embodiments, only some of airfoils 224 may employ airfoil system 246 and/or heat exchange system 244.

In these illustrative examples, fuselage 222 may be described as electrically conductive. In some advantageous embodiments, fuselage 222 may be a rigid fuselage or an inflatable fuselage, depending on the particular implementation.

As yet another example, heat exchange system 244 may be used in airfoils 224 without airfoil system 246. For example, without limitation, heat exchange system 244 may be used with airfoils that are rigid, inflatable but made of materials that may reflect electromagnetic waves, and other suitable types of airfoils.

Figure 3:
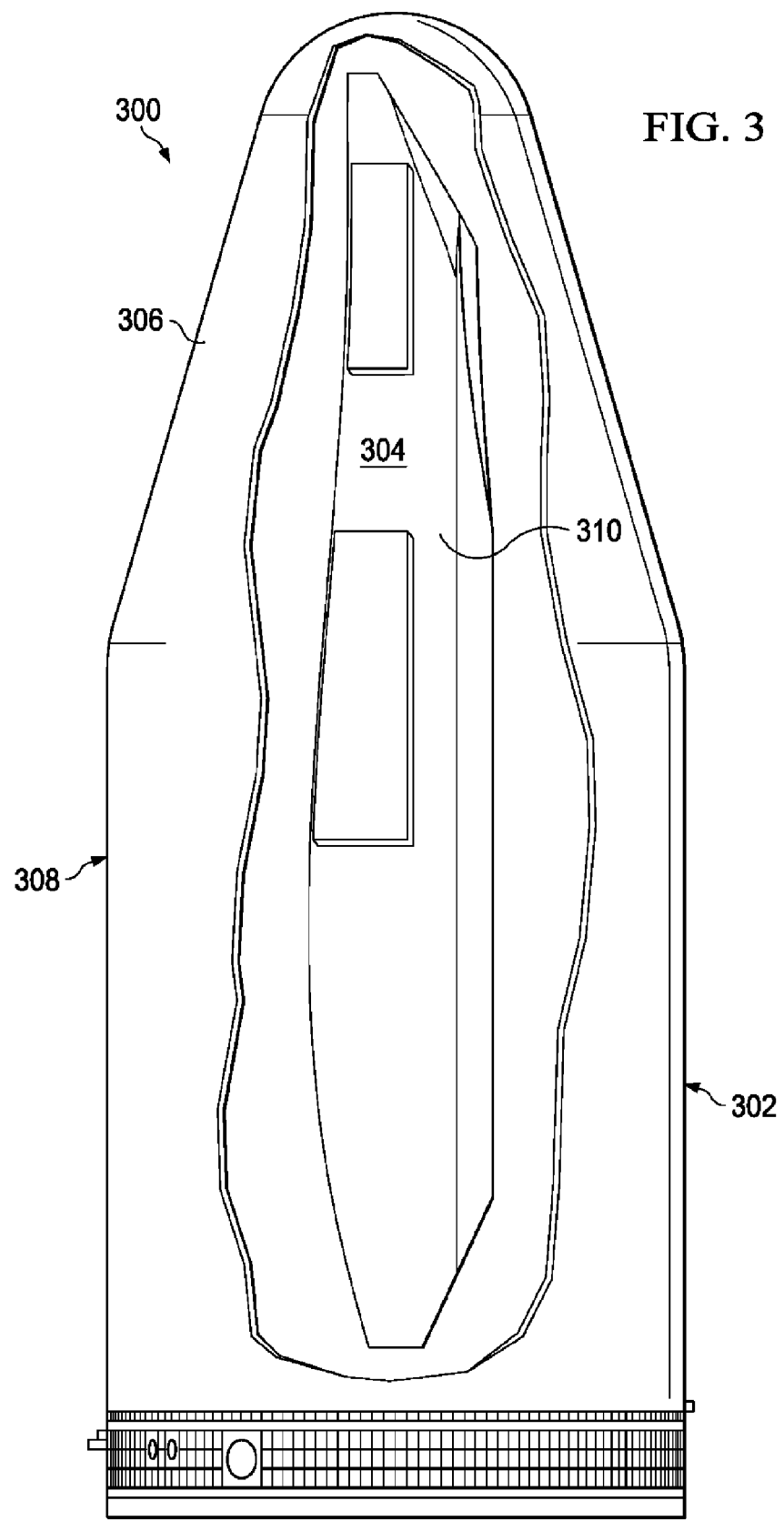
FIG. 3 is an illustration of an aircraft system in accordance with an advantageous embodiment.

With reference now to FIG. 3, an illustration of an aircraft system is depicted in accordance with an advantageous embodiment. In this illustrative example, aircraft system 300 is an example of one implementation for aircraft system 200 in FIG. 2.

In this example, aircraft system 300 is shown in a partially exposed view. Aircraft system 300 may include, for example, without limitation, delivery system 302 and aircraft 304. In this depicted example, delivery system 302 may be missile 306. In FIG. 3, payload section 308 of missile 306 is illustrated with aircraft 304. Aircraft 304, in this example, may be unmanned aerial vehicle 310.

Figure 4:
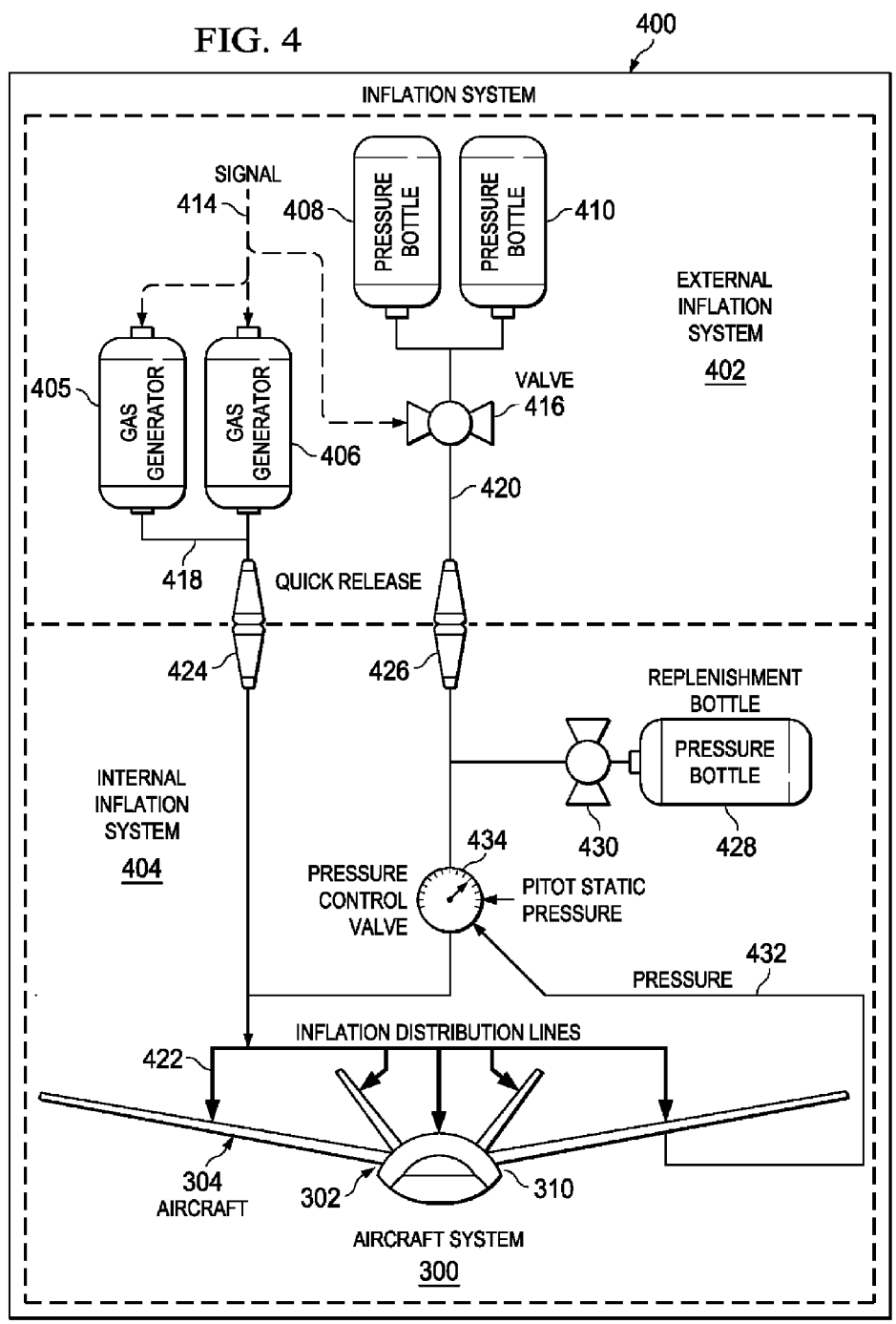
FIG. 4 is an illustration of an inflation system for an aircraft in accordance with an advantageous embodiment.

Turning now to FIG. 4, an illustration of an inflation system for an aircraft is depicted in accordance with an advantageous embodiment. Inflation system 400 is an example of one implementation of inflation system 215 and inflation system 242 in FIG. 2.

Inflation system 400 may be used to inflate components in unmanned aerial vehicle 310. In this illustrative example, inflation system 400 includes external inflation system 402, and internal inflation system 404. External inflation system 402 may be located in delivery system 302 in these examples. Internal inflation system 404 may be located within aircraft 304. In this illustrative example, external inflation system 402 is an example of one implementation for inflation system 216 in FIG. 2. Internal inflation system 404 may be an example of one physical implementation for inflation system 242 in FIG. 2.

As illustrated, external inflation system 402 may include, for example, without limitation, a number of different sources of gas. In these examples, external inflation system 402 may include gas generator 405, gas generator 406, pressure bottle 408, and pressure bottle 410.

Gas generator 405 and gas generator 406 may generate gas in a number of different ways. For example, without limitation, these gases may be produced by burning a chemical similar to rocket propellant.

Additionally, in some advantageous embodiments, gas generator 405 and gas generator 406 may be an engine in the delivery system that generates gases during operation.

In these illustrative examples, pressure bottle 408 and pressure bottle 410 may store gas in a compressed form. In these illustrative examples, pressure bottle 408 and pressure bottle 410 may store gasses such as, for example, without limitation, air, nitrogen, helium, and/or other suitable gasses. Gas generator 405 and gas generator 406 may generate gasses with a warmer temperature as compared to gasses in pressure bottle 408 and pressure bottle 410.

In these illustrative examples, signal 414 may be used to cause gas generators 405 and 406 to create gas. Signal 414 also may control valve 416 to deliver gas from pressure bottle 408 and pressure bottle 410. In these depicted examples, gas lines 418 and 420 may connect to inflation distribution lines 422 for aircraft 304. Quick release mechanisms 424 and 426 may allow for external inflation system 402 to detach from internal inflation system 404.

In these illustrative examples, internal inflation system 404 may include pressure bottle 428. Pressure bottle 428 may take the form of a gas generator, a compressor, or a storage unit for gas. Pressure bottle 428 may include gasses similar to those in pressure bottles 408 and 410. Gas may be released from pressure bottle 428 or other source through the control of valve 430.

Pressure 432 for aircraft 304 may be controlled using pressure control valve 434. If pressure 432 increases beyond the desired level, pressure control valve 434 may release gas from aircraft 304. If pressure 432 decrease below a desired level, valve 430 may be operated to introduce gas from pressure bottle 428, or another source, into aircraft 304.

The illustration of inflation system 400 in FIG. 4 is not meant to imply physical or architectural limitations to the manner in which other inflation systems may be implemented for use within an aircraft.

Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
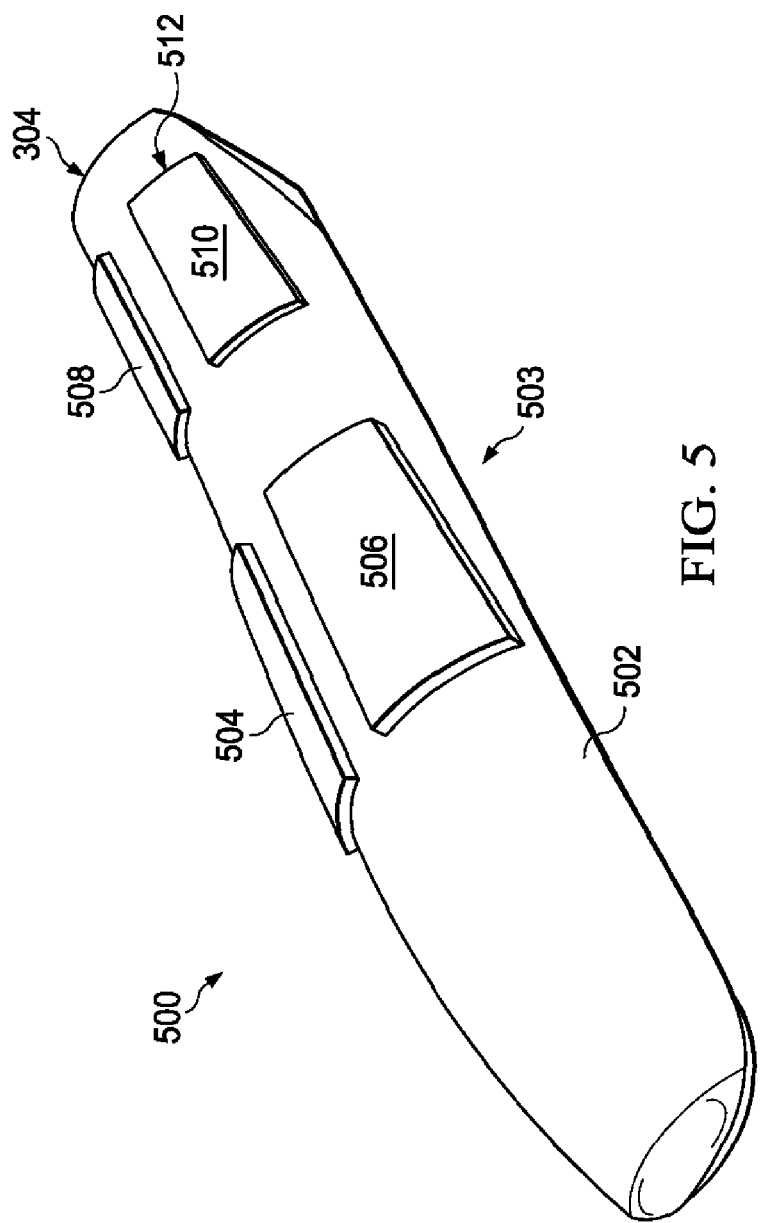
FIG. 5 is an illustration of an aircraft in an undeployed configuration in accordance with an advantageous embodiment.

For example, in some advantageous embodiments, external inflation system 402 may only use one of pressure bottles or gas generators instead of both, as illustrated in FIG. 4. In yet other advantageous embodiments, a gas generator or compressor may replace pressure bottle 428 in internal inflation system 404. In still other advantageous embodiments, other types of mechanisms may be used in addition to or in place of the ones shown for controlling the pressure in aircraft 304. With reference now to FIG. 5, an illustration of an aircraft in an undeployed configuration is depicted in accordance with an advantageous embodiment. In this illustrative example, aircraft 304 is shown in undeployed configuration 500. Aircraft 304, in this example, may have fuselage 502 and airfoils 503. As illustrated, airfoils 503 may include wing 504, wing 506, stabilizer 508, and stabilizer 510.

Figure 6:
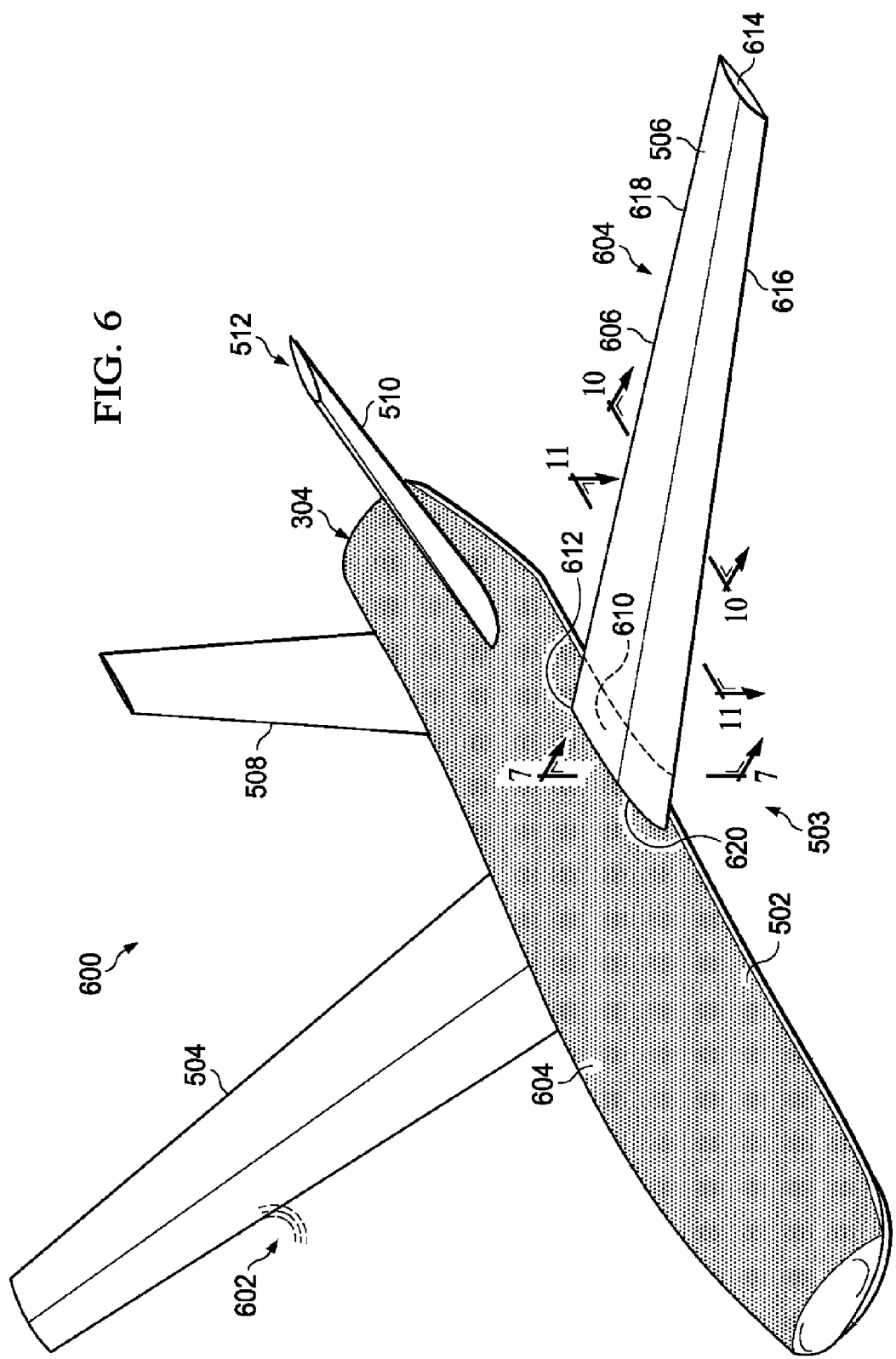
FIG. 6 is an illustration of an aircraft in a deployed configuration in accordance with an advantageous embodiment.

In these illustrative examples, stabilizer 508 and stabilizer 510 may be V-shaped stabilizers 512. Turning next to FIG. 6, an illustration of an aircraft in a deployed configuration is depicted in accordance with an advantageous embodiment. In this illustrative example, a perspective view of aircraft 304 is shown in deployed configuration 600.

As depicted, at least one of airfoils 503 may be transparent with respect to at least some frequencies of electromagnetic energy 602 encountering aircraft 503. For example, without limitation, wing 504, wing 506, stabilizer 508, and stabilizer 510 may be implemented using airfoil system 246 in FIG. 2. Electromagnetic waves 602 may substantially pass through airfoils 503 without being reflected by airfoils 503.

In these illustrative examples, airfoil system 604 may be an example of one physical implementation for airfoil system 246 in FIG. 2. As one illustrative example, airfoil system 604 may comprise wing 508 and section 610. Wing 508, may be inflatable wing 606. Section 610 may be associated with fuselage 502. Inflatable wing 606 may have inner end 612, outer end 614, leading edge 616, and trailing edge 618. In these illustrative examples, inner end 612 may be associated with fuselage 502 and section 610 at interface 620.

Figure 7:
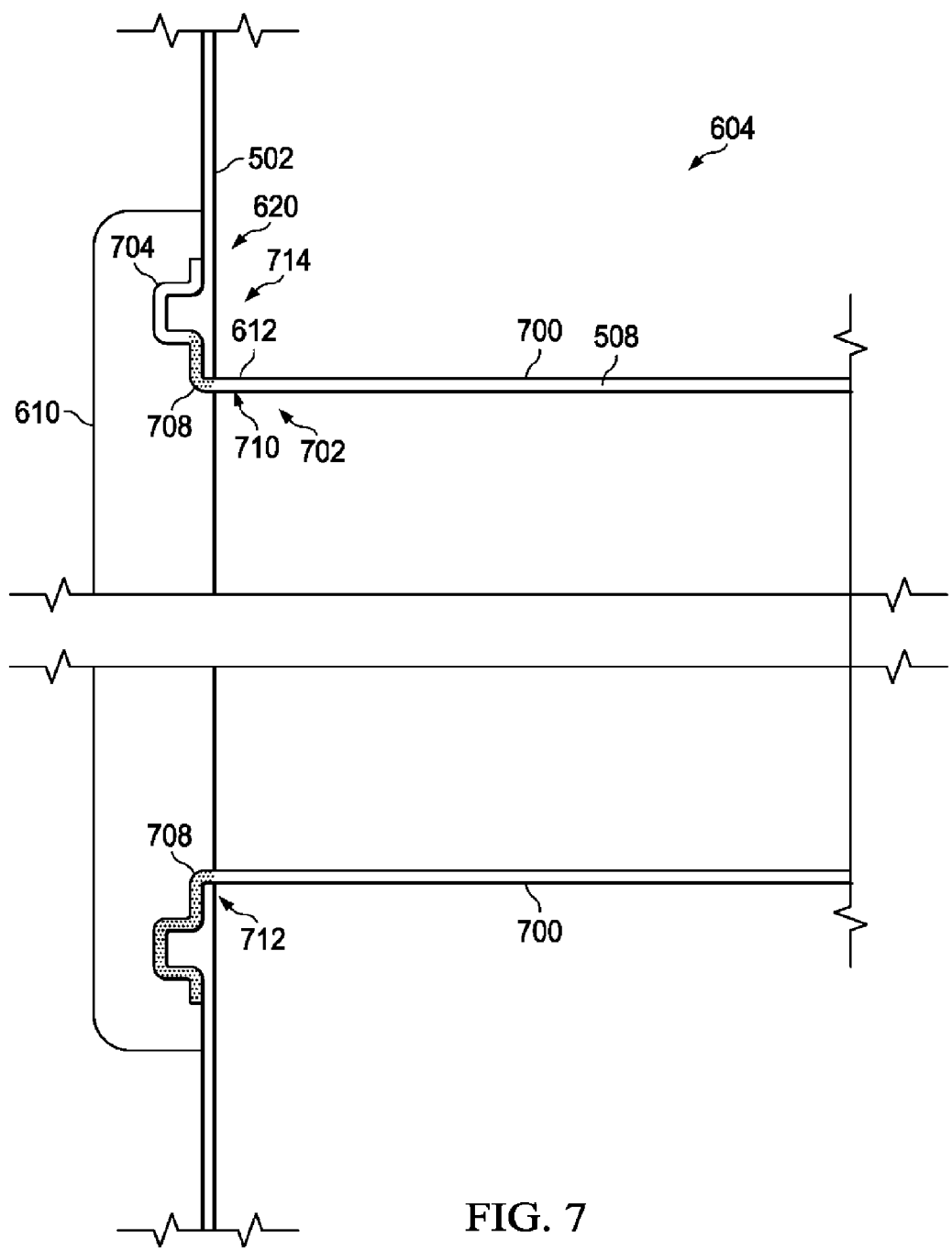
FIG. 7 is an illustration of a cross-sectional view of a portion of an airfoil system in accordance with an advantageous embodiment.

With reference now to FIG. 7, an illustration of a cross-sectional view of a portion of an airfoil system is depicted in accordance with an advantageous embodiment. In this illustrative example, a cross-sectional view of airfoil system 604 is illustrated taken along lines 7-7 in FIG. 6.

In this illustrative example, airfoil skin 700 for inflatable wing 606 may be attached to section 610 in fuselage 502 at interface 702. As can be seen in this example, section 610 may be associated with fuselage 502 at interface 620. Airfoil skin 700 may be secured to section 610 and fuselage 502 at interface 620 using serpentine seal 704, as depicted in this illustrative example. In other examples, other techniques may be used to secure airfoil skin 700 to section 610 and fuselage 502. These techniques include, for example, without limitation, bolting, bonding, gluing, and/or other types of seals.

Additionally, conductive material 708 may be associated with portion 710 and portion 712 of airfoil skin 700 in interface 620. Conductive material 708 may aid in forming electrically continuous surface 714 between fuselage 502 and section 610 at interface 620. Turning now to FIG. 8, an illustration of a portion of an airfoil system is depicted in accordance with an advantageous embodiment. In this illustrative example, section 610 may be shown as associated with fuselage 502 for aircraft 304. In these illustrative examples, section 610 may include number of openings 800. Number of openings 800 may be formed using a conductive mesh 802 in these illustrative examples. As depicted, mesh 802 may be present within opening 804 of section 610. Mesh 802 may be used to reduce and/or prevent the reflection of electromagnetic waves from opening 804.

Turning now to FIG. 9, an illustration of a portion of an airfoil system is depicted in accordance with an advantageous embodiment. In this illustrative example, another illustration of another implementation for a portion of airfoil system 246 in FIG. 2 may be depicted in accordance with an advantageous embodiment. In this illustrative example, number of openings 900 may be present in section 610. Number of openings 900 may be formed within section 610. In the illustrative examples, number of openings 900 may be sized such that electromagnetic waves may interact with the surface as if the surface is smooth and unbroken. In this manner, reflections of the electromagnetic waves may be reduced.

Number of openings 900 may be used to provide access to inflatable wing 606 to inflate inflatable wing 606. Additionally, number of openings 900 also may be used for heat exchange within inflatable wing 606.

Figure 10:
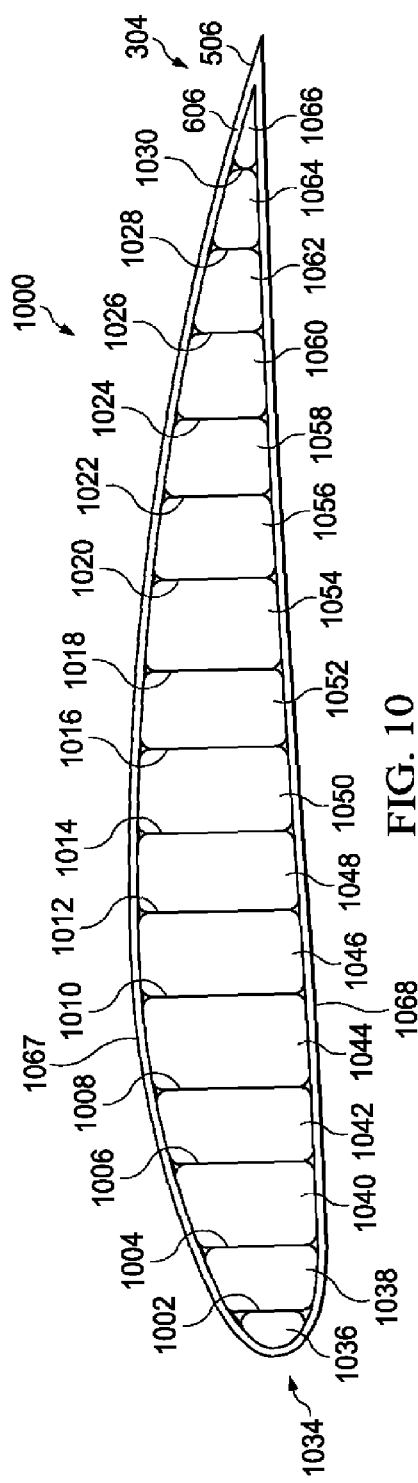
FIG. 10 is an illustration of a cross-sectional view of an airfoil in accordance with an advantageous embodiment.

With reference now to FIG. 10, an illustration of a cross-sectional view of an airfoil is depicted in accordance with an advantageous embodiment. In this illustrative example, a cross-sectional view of inflatable wing 606 may be illustrated taken along lines 10-10 in FIG. 6.

In this illustrative example, plurality of channels 1000 may include channels 1036, 1038, 1040, 1042, 1044, 1046, 1048, 1050, 1052, 1054, 1056, 1058, 1060, 1062, 1064 and 1066. These channels may be formed by sections 1034, which may include sections 1002, 1004, 1006, 1008, 1010, 1012, 1014, 1016, 1018, 1020, 1022, 1024, 1026, 1028, and 1030. Sections 1002 extend from side 1067 to side 1068 of inflatable wing 606 in these illustrative examples.

Figure 11:
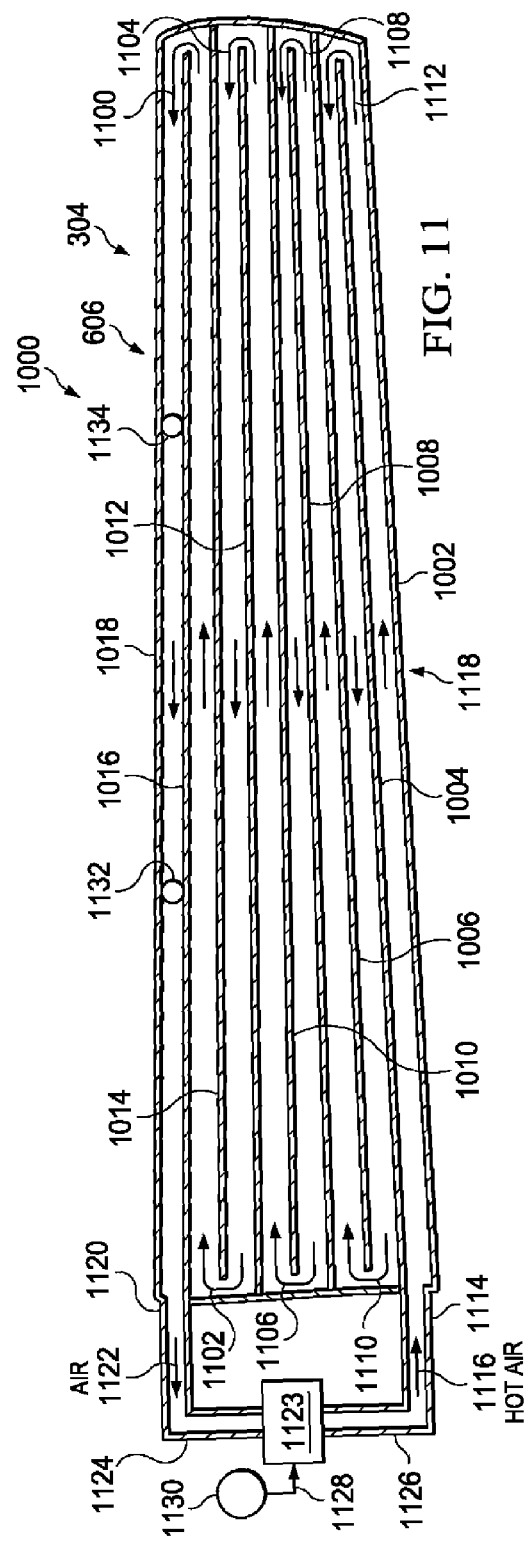
FIG. 11 is an illustration of a top cross-sectional view of an airfoil system in accordance with an advantageous embodiment.

With reference now to FIG. 11, an illustration of a top cross-sectional view of an airfoil system is depicted in accordance with an advantageous embodiment. In this illustrative example, a top cross-sectional view of inflatable wing 606 may be illustrated taken along lines 11-11 in FIG. 6.

In this illustrative example, plurality of channels 1000 may be interconnected to each other through openings 1100-1112. In addition, opening 1114 may be present to receive heated air 1116. Heated air 1116 may flow as indicated in the direction of arrows 1118.

Opening 1120 may allow air 1122 to exit. In this illustrative example, opening 1114 and opening 1120 may be in number of openings 800 in FIG. 8 and/or number of openings 900 in FIG. 9. Air 1122 may have a temperature that is lower than heated air 1116. Heated air 1116 may originate from heat exchanger 1123. Gas line 1124 may be connected to opening 1120, while gas line 1126 may be connected to opening 1114. Heat exchanger 1123 may heat heated air 1116 from heat 1128 generated by heat source 1130.

Of course, in other advantageous embodiments, opening 1120 may be located in other locations. For example, without limitation, instead of using opening 1120, opening 1132 and opening 1134 may be present. Of course, other numbers of openings and other locations for openings may be used, depending on the configuration of the heat exchange system.

The illustration of airfoils 503 and inflatable wing 606 in FIGS. 5-11 are not meant to imply physical or architectural limitations to the manner in which different advantageous embodiments may be implemented.

Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in some advantageous embodiments, inflatable wing 606 may be secured to fuselage 502 and to section 610 using other mechanisms other than a serpentine seal. In other advantageous embodiments, inner end 612 of inflatable wing 606 may be formed as an integral part of section 610. For example, without limitation, inner end 612 may be co-cured or cured as part of section 610 when section 610 is comprised of a composite material. In still other advantageous embodiments, some of airfoils 503 may not incorporate airfoil system 246 from FIG. 2.

For example, without limitation, wing 504 and wing 506 may incorporate airfoil system 246, while stabilizer 508 and stabilizer 510 may not incorporate airfoil system 246. When stabilizer 508 and stabilizer 510 incorporate airfoil system 246, section 610 may be configured to receive a shaft or member from stabilizer 508 and/or stabilizer 510 to rotate or control those airfoils.

Figure 12:
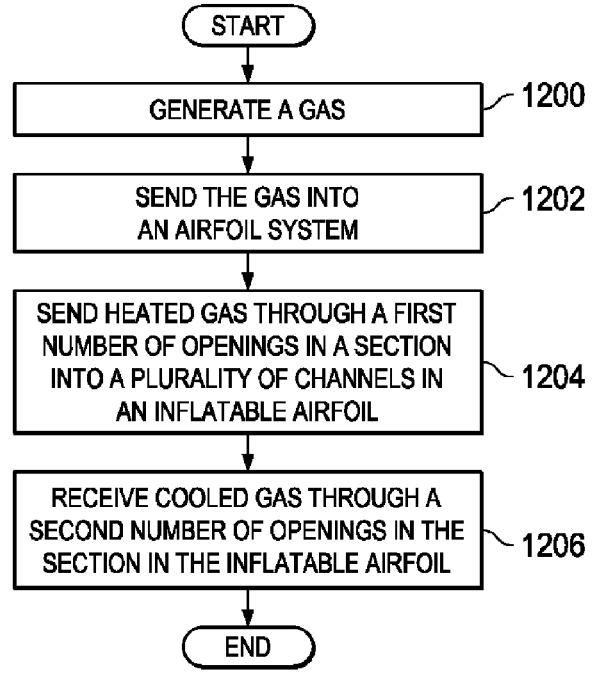
FIG. 12 is an illustration of a flowchart for operating an airfoil system in accordance with an advantageous embodiment.

With reference now to FIG. 12, an illustration of a flowchart for operating an airfoil system is depicted in accordance with an advantageous embodiment. In these illustrative examples, the process illustrated in FIG. 12 may be implemented in aircraft system 200 in FIG. 2. In particular, one or more of the different advantageous embodiments may be implemented using airfoil system 246 in FIG. 2.

The process may begin by generating gas 252 (operation 1200). Gas 252 may be generated in a number of different ways. For example, without limitation, gas 252 may be generated from a chemical reaction, using a compressor, or stored compressed gas. The process may then send the gas into airfoil system 246 (operation 1202). In these examples, airfoil system 246 may comprise inflatable airfoil 248 and section 274. In this manner, inflatable airfoil 248 may be changed from uninflated configuration 250 to inflated configuration 251. This change in configuration may be part of a deployment of aircraft 202 in these illustrative examples.

Next, heated gas 205 may be sent through first number of openings 201 in section 274 into plurality of channels 294 in inflatable airfoil 248 (operation 1204). Heated gas 205 may be sent into plurality of channels 294 using heat exchanger 293 in heat exchange system 244. Cooled gas 207 then may be received through second number of openings 203 (operation 1206), with the process terminating thereafter. Heated gas 205 may be cooled in temperature to form cooled gas 207. In this manner, a heat source may be cooled using inflatable airfoil 248. Additionally, this mechanism for cooling heated gas 205 may distribute the heat in a manner that reduces detectability 279 of aircraft 202 by infrared detection system 283 in these illustrative examples.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures.

For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram. For example, in some advantageous embodiments, heat exchange system 244 may not be used to cool aircraft 202.

Thus, the different advantageous embodiments may provide a method and apparatus for an airfoil system. In these illustrative examples, the airfoil system may comprise an inflatable airfoil with a section. The inflatable airfoil may have an inner end and an outer end in which the inflatable airfoil may be comprised of a number of materials that substantially pass electromagnetic waves through the inflatable airfoil.

The section may have a number of openings in which the inner end of the inflatable airfoil is associated with the section. The section may be configured to be associated with a fuselage of an aircraft. The number of openings may be configured to provide communications with an interior of an inflatable airfoil. The section with the number and size of openings may be configured to reduce reflection of electromagnetic waves encountering the section.

In this manner, the different advantageous embodiments may reduce the detectability of an aircraft to various detection systems. For example, without limitation, the reduction in the reflectivity of the inflatable airfoil may reduce detection by detection systems using electromagnetic waves, such as radar systems. The heat exchange system for cooling heat sources in an aircraft may reduce the detectability of the aircraft to detection systems, such as infrared detection systems. Further, the different advantageous embodiments also provide a capability to reduce the volume and size of the aircraft through the use of inflatable airfoils.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a fuselage;
   an inflatable airfoil connected to the fuselage and having an inner end and an outer end, the inflatable airfoil comprising a number of materials substantially transparent to electromagnetic waves through the inflatable airfoil, the inflatable airfoil further comprising a plurality of channels interconnected to form a serpentine flow path for a gas; and
   a section of the inflatable airfoil associated with the fuselage and having a number of openings including a first number of openings and a second number of openings, the first number of openings and the second number of openings in communication with at least some of the plurality of channels, the first number of openings configured to pass a heated gas into the plurality of channels and the second number of openings configured to allow the gas when cooled to exit out of the plurality of channels.

2. The apparatus of claim 1, wherein the section of the inflatable airfoil is configured to form an electrically continuous surface with the fuselage.

3. The apparatus of claim 1, further comprising an interface between the fuselage and the section of the inflatable airfoil configured to be electrically continuous with the fuselage and the section.

4. The apparatus of claim 3, wherein the inner end of the inflatable airfoil is associated with the interface.

5. The apparatus of claim 4, wherein a serpentine seal associates the inner end of the inflatable airfoil with the interface.

6. The apparatus of claim 1, wherein the section of the inflatable airfoil is configured to allow an electrical current to flow between the section and the fuselage.

7. The apparatus of claim 1, wherein the second number of openings is located at the inner end of the inflatable airfoil.

8. The apparatus of claim 1, wherein the second number of openings is in a location selected from at least one of a surface of the inflatable airfoil, the outer end of the inflatable airfoil, a leading edge of the inflatable airfoil, and a trailing edge of the inflatable airfoil.

9. The apparatus of claim 1, wherein the number of materials is selected from one of polyurethane, a bi-directional polyester film, plastic, a para-aramid synthetic fiber with an airtight liner, and nylon with the airtight liner.

10. The apparatus of claim 1, wherein the electromagnetic waves have a frequency from about 30 MHz to about 300 GHz.

11. The apparatus of claim 1, wherein the inflatable airfoil is selected from one of a wing, a canard, a stabilizer, a horizontal stabilizer, a vertical stabilizer, and a V-shaped stabilizer.

12. A system for an unmanned aerial vehicle, the system comprising:
a fuselage;
an inflatable airfoil having an inner end and an outer end, the inflatable airfoil comprising a number of materials substantially transparent to electromagnetic waves, the inflatable airfoil further comprising a plurality of channels interconnected to form a serpentine flow path for a gas;
wherein a section of the inflatable airfoil is associated with the fuselage at an interface, the section of the inflatable airfoil having a number of openings in communication with at least some of the plurality of channels, the section of the inflatable airfoil configured to form an electrically continuous surface with the fuselage by allowing an electrical current to flow between the section of the inflatable airfoil and the fuselage, the section of the inflatable airfoil further configured to reduce an entry of the electromagnetic waves into an interior of the fuselage;
an airfoil skin forming a surface of the inflatable airfoil, a portion of the airfoil skin at the inner end of the inflatable airfoil associated with the fuselage at the interface by a serpentine seal;
a heat exchange system in fluid communication with the plurality of channels, a first number of openings in the number of openings in the section of the inflatable airfoil in communication with the plurality of channels, and a second number of openings in communication with the plurality of channels, the first number of openings configured to pass a heated gas into the plurality of channels and the second number of openings configured to allow the gas when cooled to exit out of the plurality of channels, the second number of openings further configured to send a cooled gas to a location selected from at least one of the inner end of the inflatable airfoil, the surface of the inflatable airfoil, the outer end of the inflatable airfoil, a leading edge of the inflatable airfoil, and a trailing edge of the inflatable airfoil; and
an inflation system connected to the inflatable airfoil, the inflatable airfoil selected from one of a stabilizer, a horizontal stabilizer, a vertical stabilizer, and a V-shaped stabilizer.

13. An apparatus comprising:
an airfoil having an inner end and an outer end, the airfoil further having a plurality of channels interconnected to form a serpentine flow path for gas within the airfoil;
a first number of openings in communication with the plurality of channels; and
a second number of openings in communication with the plurality of channels, the first number of openings and the second number of openings associated with at least some of the plurality of channels, the first number of openings configured to pass a heated gas into the plurality of channels and the second number of openings configured to allow the gas when cooled to exit out of the plurality of channels.

14. The apparatus of claim 13, wherein the airfoil is an inflatable airfoil comprised of a number of materials substantially transparent to electromagnetic waves through the inflatable airfoil.

15. The apparatus of claim 14, wherein the first number of openings and the second number of openings are connected to a fuselage of an aircraft.

16. The apparatus of claim 15, further including a heat exchange system comprising a plurality of gas lines within the aircraft, wherein a third and fourth number of openings are in communication with said gas lines and the plurality of channels.

17. The apparatus of claim 14, wherein the second number of openings is located at the inner end of the inflatable airfoil.

18. The apparatus of claim 17, wherein the second number of openings is in a location selected from at least one of a surface of the airfoil, the outer end of the inflatable airfoil, a leading edge of the airfoil, and a trailing edge of the airfoil.

* * * * *